United States Patent [19]
Iwai

[11] Patent Number: 5,533,146
[45] Date of Patent: Jul. 2, 1996

[54] WELD BEAD QUALITY DETERMINING APPARATUS

[75] Inventor: Takao Iwai, Toyota, Japan

[73] Assignee: Toyota Jidosha Kabushiki Kaisha, Toyota, Japan

[21] Appl. No.: 341,040

[22] Filed: Nov. 14, 1994

Related U.S. Application Data

[63] Continuation of Ser. No. 942,770, Sep. 10, 1992, abandoned.

[30] Foreign Application Priority Data

Sep. 11, 1991 [JP] Japan .................................. 3-258738

[51] Int. Cl.⁶ ...................................................... G06K 9/00
[52] U.S. Cl. ........................ 382/150; 382/100; 382/141; 382/152; 219/121.63; 219/124.34; 348/90
[58] Field of Search ............................. 382/1, 8, 100, 382/141, 150, 152; 219/130.01, 124.34, 121.63; 348/90, 719; 364/500

[56] References Cited

U.S. PATENT DOCUMENTS

| | | | |
|---|---|---|---|
| 4,501,950 | 2/1985 | Richardson | 219/124.34 |
| 4,677,473 | 6/1987 | Okamoto et al. | 382/150 |
| 4,733,051 | 3/1988 | Nadeau et al. | 219/130.21 |
| 4,739,404 | 4/1988 | Richardson | 348/90 |
| 4,916,286 | 4/1990 | Sarugaku et al. | 219/124.34 |
| 5,182,775 | 1/1993 | Matsui et al. | 382/152 |

FOREIGN PATENT DOCUMENTS

| | | | |
|---|---|---|---|
| 0108599 | 5/1984 | European Pat. Off. | B23K 9/02 |
| 0116798 | 8/1984 | European Pat. Off. | B23K 9/095 |
| 49-39445 | 4/1974 | Japan . | |
| 51-95866 | 8/1976 | Japan | G01B 11/02 |
| 58-209481 | 12/1983 | Japan | B23K 9/095 |

OTHER PUBLICATIONS

John E. Agapakis, Approaches for Recognition & Interpretation of Workpiece Surface Features Using Structured Lighting, The International Journal of Robotics Research, 9 (1990) Oct., No. 5.

Primary Examiner—Jose L. Couso
Assistant Examiner—Anh Hong Do
Attorney, Agent, or Firm—Cushman, Darby & Cushman

[57] ABSTRACT

An apparatus for determining quality of a weld bead of an welded assembly of different metal sheets, wherein a slit beam of light is obliquely thrown on the weld bead to make an illuminated band on an upper surface of the welded assembly. A CCD camera disposed above the welded bead photographs the illuminated band to make an image of the illuminated band. The image is treated in an image pretreatment device so that a surface of a transverse cross section of the weld bead can be expressed in the form of one-dimensional data. Characteristics of the cross section of the weld bead are extracted from the one-dimensional data and are compared with predetermined references in a personal computer so that it is determined whether the weld bead is acceptable. Since the speed of data treatment is high, an on-line and real-time determination of the quality of the weld bead is possible.

12 Claims, 8 Drawing Sheets

_5,533,146_

WELD BEAD QUALITY DETERMINING APPARATUS

This is a continuation of Application No. 07/942,770, filed on Sep. 10, 1992, which was abandoned.

BACKGROUND OF THE INVENTION

1. Field of the Invention

The present invention relates to an apparatus for determining quality of a weld bead, especially, a laser weld bead.

2. Description of the Prior Art

Different metal sheets are laser-welded into one-piece assemblies which are then stamped to be used for automobile panels. The weld beads of the assemblies require inspection along the entire weld line to assure that the weld beads have sufficient strength for pressing along with configurations which will not damage the press rolls. To decrease the time period taken in inspection, it has been desired to mechanize the inspection.

Japanese Patent Publication SHO 49-39445 discloses an apparatus with a slit beam of light illuminating a weld bead (arc-weld bead) to make an illuminated band on the surface of the weld bead, photographing the illuminated band by a television camera to make a photograph plane including an image of the illuminated band, and determining the quality of the weld bead based on the image. The technique of using a slit beam of light for detection is also disclosed in Japanese Patent Publication SHO 51-95866.

However, in the conventional apparatus, the image is treated as two-dimensional data, and the entire photograph plane will possess about sixty thousand elements that have to be scanned horizontally and vertically to acknowledge the image. If such an image determination is incorporated into a personal computer for weld bead inspection, the inspection speed (speed of the camera moved along the weld bead) will be too low or the sampling pitch will be too coarse. As a result, an on-line and real-time inspection will be impossible.

SUMMARY OF THE INVENTION

An object of the invention is to provide a weld bead quality determining apparatus wherein the period of time necessary for treating the image data and the period of time for determining whether the weld bead is acceptable are shortened so that an on-line and real-time inspection of the weld bead is possible.

BRIEF DESCRIPTION OF THE DRAWINGS

The above and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

Figure 1:
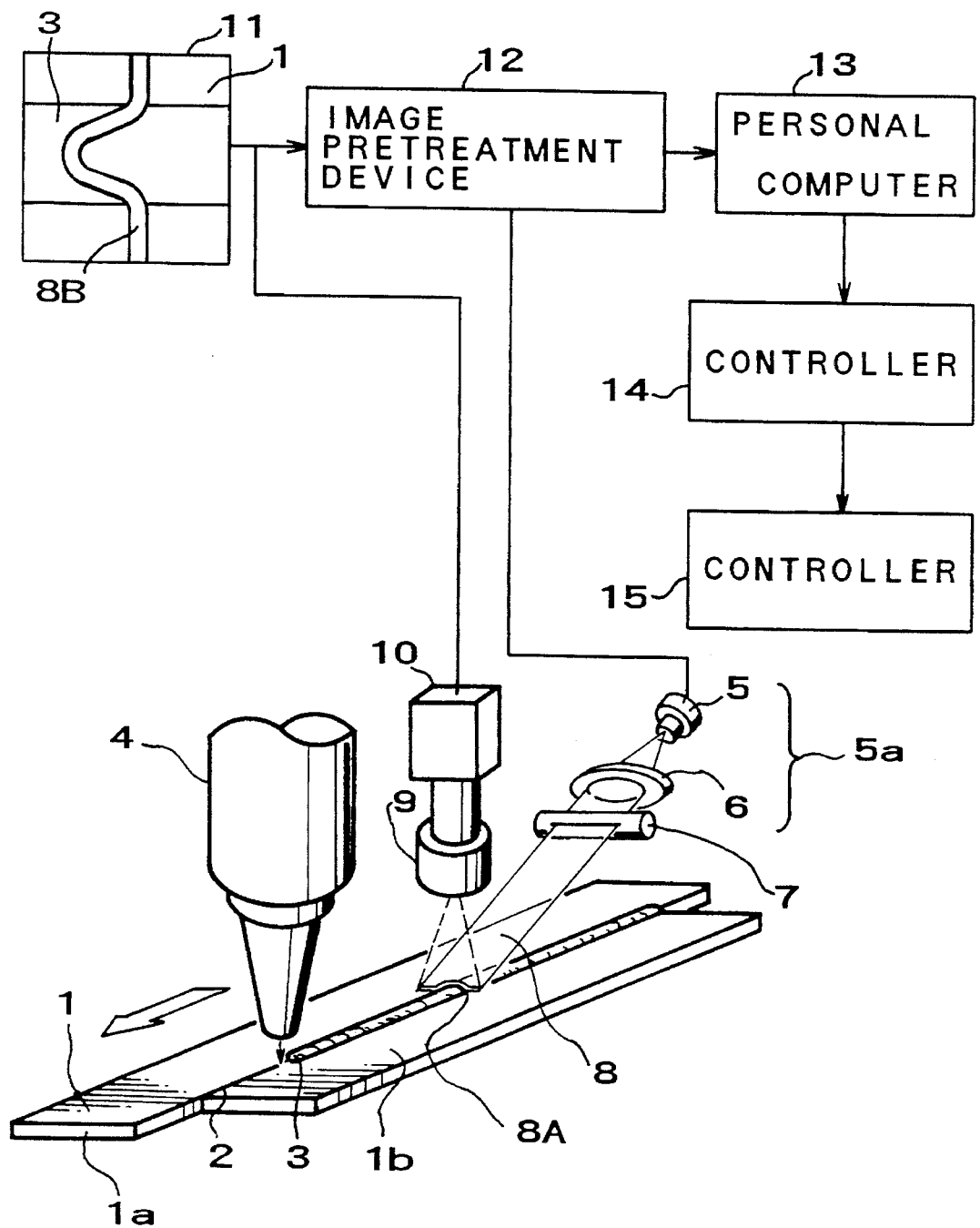
FIG. 1 is a schematic oblique view including a system diagram of a weld bead quality determining apparatus in accordance with one embodiment of the invention.

As illustrated in FIG. 1, different metal sheets (for example, steel sheets) $1a$ and $1b$ are abutted at an abutment line or weld line 2. A laser beam is irradiated on the abutment portion so that the metal sheets are joined together by a weld bead 3 into a one-piece material 1. A laser welding torch 4 collects the laser beam by a lens or a parabolic mirror and irradiates the laser beam on the weld line 2. The laser torch 4 is held and moved by a robot arm so that the movement of the laser torch 4 is numerically controlled.

To determine the quality of the weld bead 3, a weld bead quality determining apparatus including a slit beam emitter $5a$, a CCD (charge-coupled device) camera 10, an image pretreatment device 12, and a computer 13 is provided. The weld bead quality determining apparatus may further include an inspection controller 14 and a welding machine controller 15.

The slit beam emitter $5a$ is held by the robot arm and is moved along the weld bead 3, chasing the laser torch 4. The slit beam emitter $5a$ includes a semiconductor laser 5 for emitting a laser beam, and a collimator lens 6 and a cylindrical lens 7 for collecting the laser beam emitted from the semiconductor laser into a slit beam of light 8. The slit beam emitter $5a$ throws the slit beam 8 obliquely and downwardly on the weld bead 3 of the metal sheet assembly 1 with a width direction of the slit beam 8 perpendicular to a longitudinal direction of the weld bead 3. The slit beam 8 makes an illuminated band 8A on the upper surface of the weld bead 3 and the vicinity thereof of the metal sheet assembly 1. The illuminated band 8A crosses the weld bead 3 at a right angle and is distorted as viewed from above when an upper surface of the weld bead 3 is convex or concave with respect to the upper surfaces of the metal sheets $1a$ and $1b$.

The CCD camera 10 is held by the robot arm above the illuminated band 8A and is moved along the weld bead 3 by the robot arm so as to chase the laser torch 4. The CCD camera 10 photographs the illuminated band 8A and the vicinity thereof through a lens 9 and makes a photograph plane which includes an image 8B of the illuminated band 8A. The image 8B extends in a longitudinal direction that is perpendicular to the weld bead and has a small width. The image 8B is brighter than the remaining portion of the photograph plane. The brightness of the image 8B changes in a width direction of the image 8b. More particularly, the closer to the width center, the greater the brightness level.

A display 11 may be provided. The display 11 is electrically connected to the CCD camera 10 and displays the photograph plane photographed by the CCD camera 10. In the photograph plane of the display 11, the weld bead 3 extends horizontally while the image 8B of the illuminated band 8A extends vertically and crosses the weld bead 3. When the upper surface of the weld bead 3 is convex or concave with respect to the upper surface of the metal sheets 1a and 1b, the image 8b will be distorted toward a left side or a right side from the vertical line as shown in FIG. 1, because the slit beam 8 is irradiated obliquely on the weld bead 3.

The image pretreatment device 12 is electrically connected to the CCD camera 10. The image pretreatment device 12 treats the image photographed by the CCD camera to determine a width center of the image 8B along each scanning line, converts the width center to a digital signal, and feeds the signal to the computer 13 per each scanning line.

Figure 3:
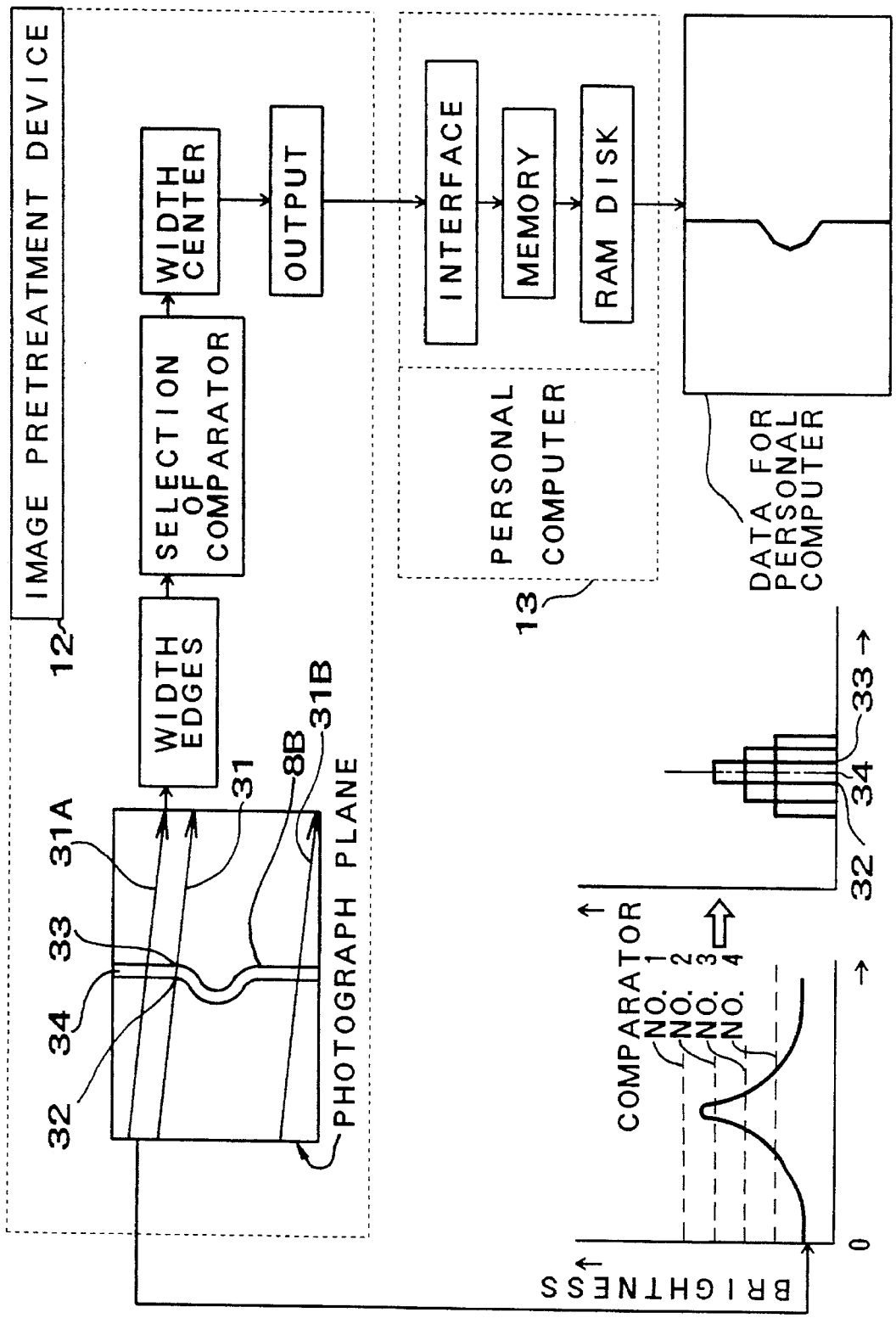
FIG. 3 is a block diagram for an image pretreatment device and a computer of the apparatus of FIG. 1.

More particularly, as illustrated in more detail in FIG. 3, the image pretreatment device 12 scans the photograph plane along a horizontally extending scanning line 31 which is perpendicular to the longitudinal direction of the image 8B and is moved vertically. The image pretreatment device 12 extracts two signals corresponding to opposite width edges 32 and 33 of the image 8B along each horizontally extending scanning line 31 and determines a center 34 of a distance between the two edges 32 and 33.

In determining the two width edges 32 and 33, a plurality of (four in the instant embodiment) reference brightness levels are applied. In FIG. 3, a No. 1 comparator has the greatest reference brightness, a No. 2 comparator has the second greatest reference brightness, a No. 3 comparator has the third greatest reference brightness, and a No. 4 has the lowest reference brightness. First, the No. 1 comparator is applied to the image 8B. However, in the case of the brightness pattern of the image of FIG. 3, the No. 1 comparator does not interfere with the peak of the brightness of the image 8B and cannot find width edges of the image 8B. Then, the No. 2 comparator is applied to the image 8B and the No. 2 comparator finds two edges of the image 8B of the illuminated band. The No. 3 comparator and the No. 4 comparator also find two edges of the image 8B. The edges detected by a comparator having a greater reference brightness is superior to the edges detected by a comparator having a lower reference brightness. Thus, the edges detected by the No. 2 comparator are adopted as the edges of the image 8B. As a result of providing a plurality of reference brightness levels, the width center (most brightened position along the scanning line) of the image 8B is determined as exactly as possible without greatly increasing the scanning time period. More particularly, if the shape of brightness is distorted and is asymmetric with respect to the center of the bright band, the center can be determined relatively exactly by selecting the edges detected by the comparator having a higher reference brightness. Further, since the number of the reference brightnesses is four, the time for determining the center of the bright band is not extremely increased.

Then, the image pretreatment device 12 determines a single signal corresponding to the width center of the image 8B along each scanning line 31 based on the two edge signals and then converts the single signal into a machine language, which is a digital signal, so that the computer 13 can quickly read the machine language. Then, the image pretreatment device 12 feeds the signal to the computer 13.

The scanning line 31 is moved vertically at predetermined period intervals from the start position 31A (see FIG. 3) to the end position 31B (see FIG. 3) per each photograph plane. Each signal corresponding to the width center 34 of the image 8B obtained during scanning along each scanning line 31 is fed to the computer 13 and stored in a memory of the computer 13.

The computer 13 is electrically connected to the image pretreatment device 12. The computer 13 has a memory and a RAM (random access memory) disk which is constructed of a semiconductor memory for enabling fast operation. The computer 13 has a central processor unit (CPU) for determining a center line 8C of the image 8B based on the width center signals fed from the image pretreatment device 12 and for determining characteristics of the weld bead 3 corresponding to the instant photograph plane based on the center line 8C. The above-described scanning and data storing operation are performed in accordance with a flow chart of FIG. 4 which is stored in the memory and read out to the CPU where the control is executed.

Figure 4:
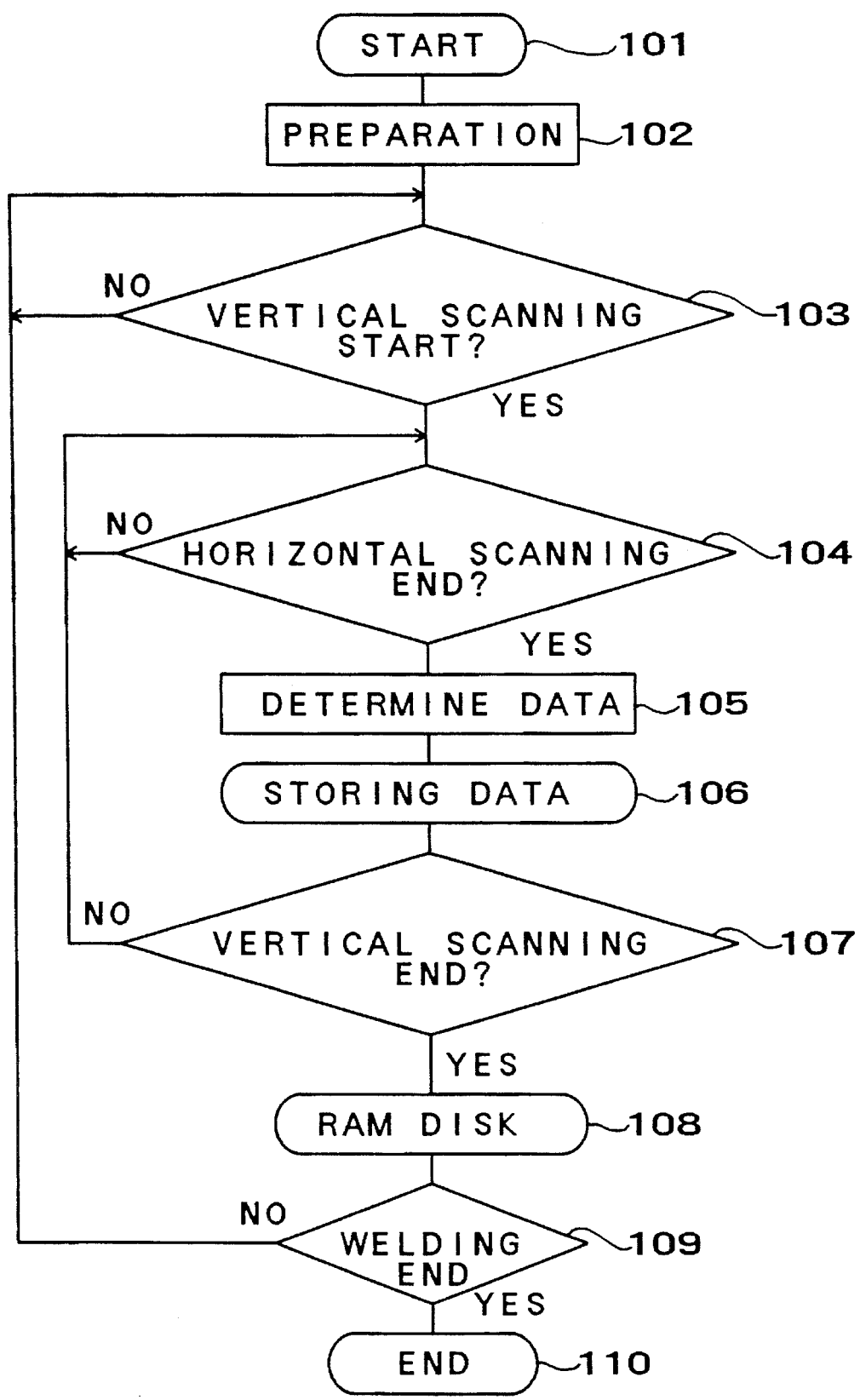
FIG. 4 is a flow chart for determining width center of the illuminated band and storing the data into a RAM disk of the computer.

In FIG. 4, at step 101, scanning of the photograph planes starts. At step 102, the RAM disk of the computer is initialized to be ready for storing data. Then, at step 103, it is determined whether a scanning line may be moved vertically. If the scanning line may be moved vertically at step 103, scanning along an instant horizontally extending line starts and the routine proceeds to step 104, where it is determined whether the scanning along the horizontal scanning line ends. When the scanning along the instant scanning line ends, the routine proceeds to step 105 where two signals corresponding to the width edges 32 and 34 of image 8B are determined and a width center 34 of the image is determined in the form of a digital signal. Then, at step 106, the signals are stored in the memory of the computer 13.

Then, the routine proceeds to step 107 where scans along the horizontal lines are repeated and the centers of the image are successively stored in the memory, until the image 8B has been scanned by the horizontal scan lines over the entire length of the image 8B from the start vertical position 31A to the end vertical position 31B. When the vertical scanning ends at sep 107, the routine proceeds to step 108, where the center line 8C of the image 8B which is a plot of the centers stored in the computer is formed per each photograph plane and is stored in the RAM disk of the computer.

The center line 8C of the image 8B represents the typical surface configuration of the weld bead 3 and the vicinity thereof in the form of one-dimensional data. Such a one-dimensional representation decreases the number of data points as compared with the conventional two-dimensional system. In the case of the one-dimensional system, only about two-hundred and forty data points are necessary to represent the weld bead 3 of one photograph plane, while about sixty thousand data points are necessary to represent a weld bead of one photograph plane in the conventional method which handles two-dimensional data. This extremely reduced amount of data allows for high-speed treatment and analysis of the weld bead.

Then, the routine proceeds to step 109, where it is determined whether welding has been performed over the entire weld line 2. In this way, the weld bead is inspected over the entire length at intervals, until the welding is finished. When the welding is finished, the routine proceeds from step 109 to step 110, where the data formation and storing into the computer 13 stops according to the end of the routine.

Figure 5:
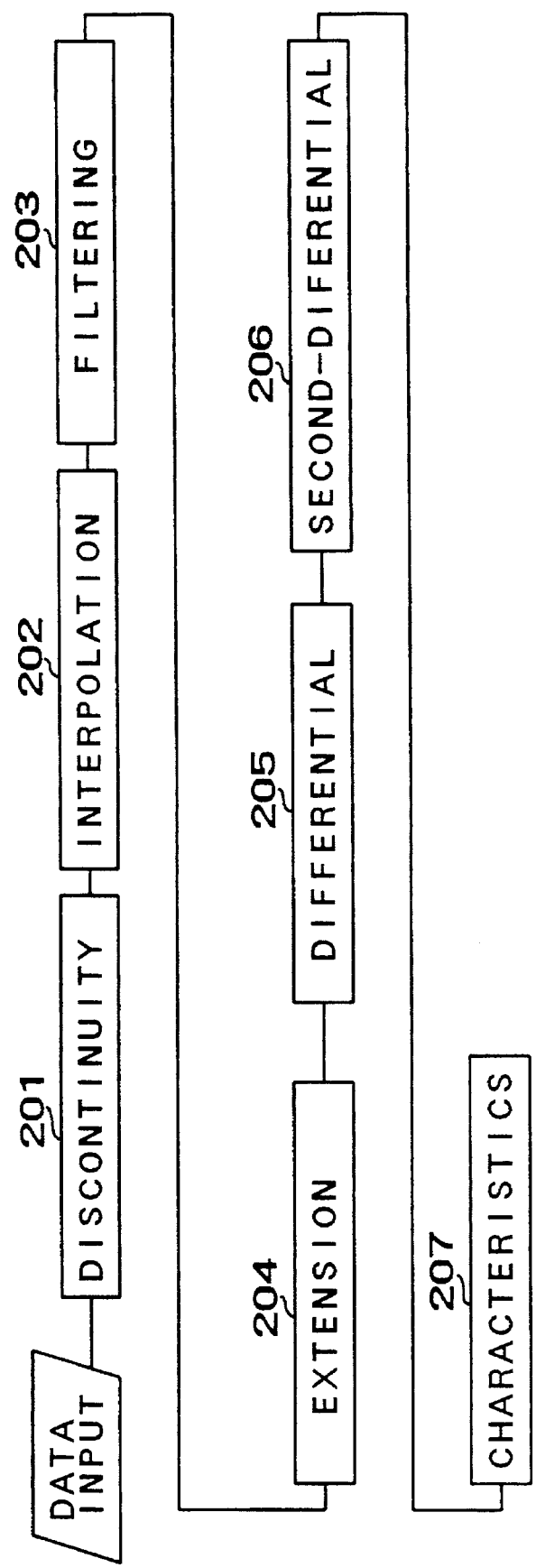
FIG. 5 is a flow chart for extracting characteristic data of the weld bead at each position of the weld line.

When the welding has been finished, the data corresponding to one photograph plane is successively read out from the data of all the photograph planes which have been stored in the RAM disk, and is treated in accordance with a routine of FIG. 5 so that characteristics a–f, $\theta_1$ and $\theta_2$ of a weld bead are determined with respect to the weld bead of each photograph plane. The meanings of the respective characteristic references a–f, $\theta_1$, and $\theta_2$ are determined as follows: a means a position of one width edge of the weld bead, b means a position of the other width edge of the weld bead, c means a position of a peak of a weld bead surface in the case where the weld bead is convex, f means a position of a bottom of a weld bead surface in the case where the weld bead is concave, d means a position of the surface of one metal sheet of the two metal sheets 1a and 1b, e means a position of the surface of the other metal sheet, $\theta_1$ means a gradient of the tangent of one side of the weld bead, and $\theta_2$ means a gradient of the tangent of the other side of the weld bead.

In FIG. 5, at step 201, a discontinuous portion (for example, a melt-down portion) of the width center line of the image 8B is detected, if any. Then, at step 202, the discontinuous portion of the data is interpolated. Then, at step 203, the data of the width center line of the image 8B is filtered so that any noise is removed from the data. Then, at step 204, the data is further treated to be extended so as to embed the removed portion. Then, at step 205, a differential treatment is applied to the data so that the gradients of the tangents of the weld bead are obtained. Further, at step 206, a second-order differential treatment is applied to the data so that the curvature of the weld bead is obtained. Then, at step 207, the above-described characteristics a–f, $\theta_1$, and $\theta_2$ are extracted from the data which has just been treated by steps 201 to 206.

Figure 6:
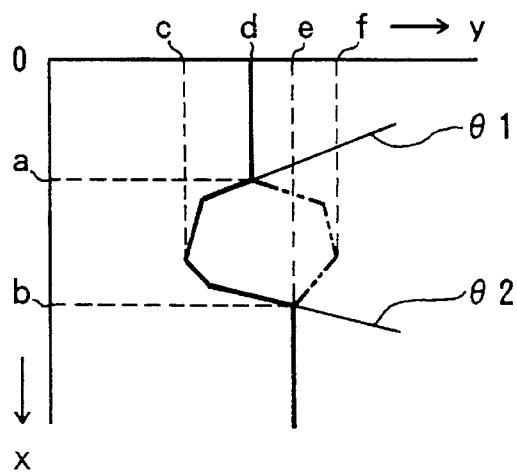
FIG. 6 is typical characteristics of a cross section of a weld bead.
Figure 7:
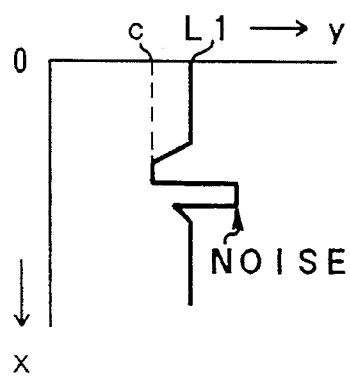
FIG. 7 is a graphical representation of an image center line having a noise.
Figure 8:
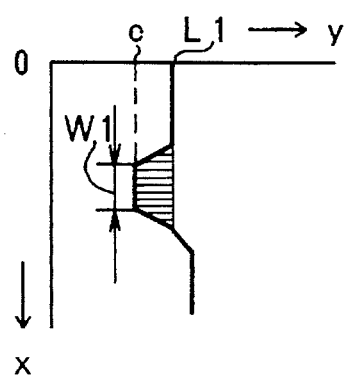
FIG. 8 is a graphical representation of an image center line used in removing a noise from the characteristics of the weld bead.
Figure 9:
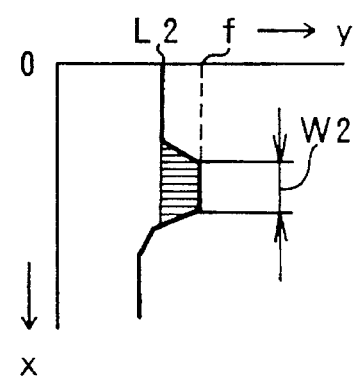
FIG. 9 is another graphical representation of an image center line used in removing a noise from the characteristics of the weld bead.

The above-described filtering of the data at step 203 is executed as illustrated in FIGS. 7–9. More particularly, when the width center line of the image 8B is disturbed by some noise (for example, due to attachment of a weld sputter metal to the weld bead surface) as shown in FIG. 7, the characteristic references c and f (see FIG. 6) should be determined so as not to include the noise. In order to remove the noise from the data, as illustrated in FIG. 8, histograms of x-values are formed within the range of 0–L1 of y-values, and the y-value which offers the greatest x-histogram range W1 is determined to be the characteristic c. Similarly, as illustrated in FIG. 9, histograms of x-values are formed within the range of L2—the maximum y value with respect to y-values, and the y-value which offers the greatest x-histogram range W2 is determined to be the characteristic f. Then, W1 and W2 are compared with each other. If W1 is equal to or greater than W2, f is supposed to be a noise and is replaced by L2 (the same level of the upper surface of one metal sheet). Similarly, if W1 is smaller than W2, c is replaced by L1. The thus extracted values of the weld bead of each photograph plane are stored in the RAM disk of the computer 13. This image treatment is applied to all the photograph planes photographed by the CCD camera at intervals so that the characteristics of the weld bead 3 are formed at intervals over the entire length of the weld line.

Figure 2:
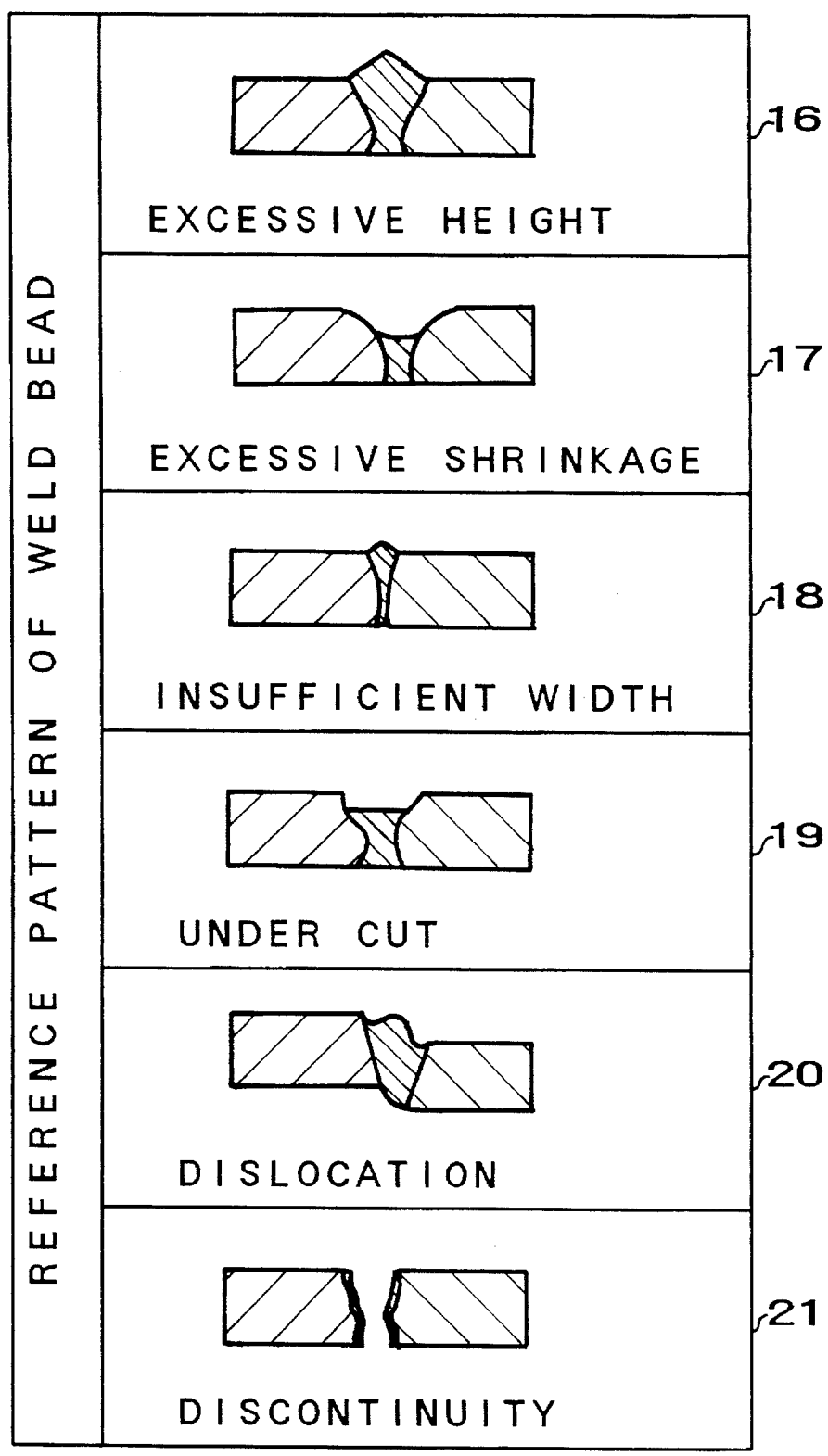
FIG. 2 is a table including typical patterns for determining the quality of the weld bead.
Figure 10:
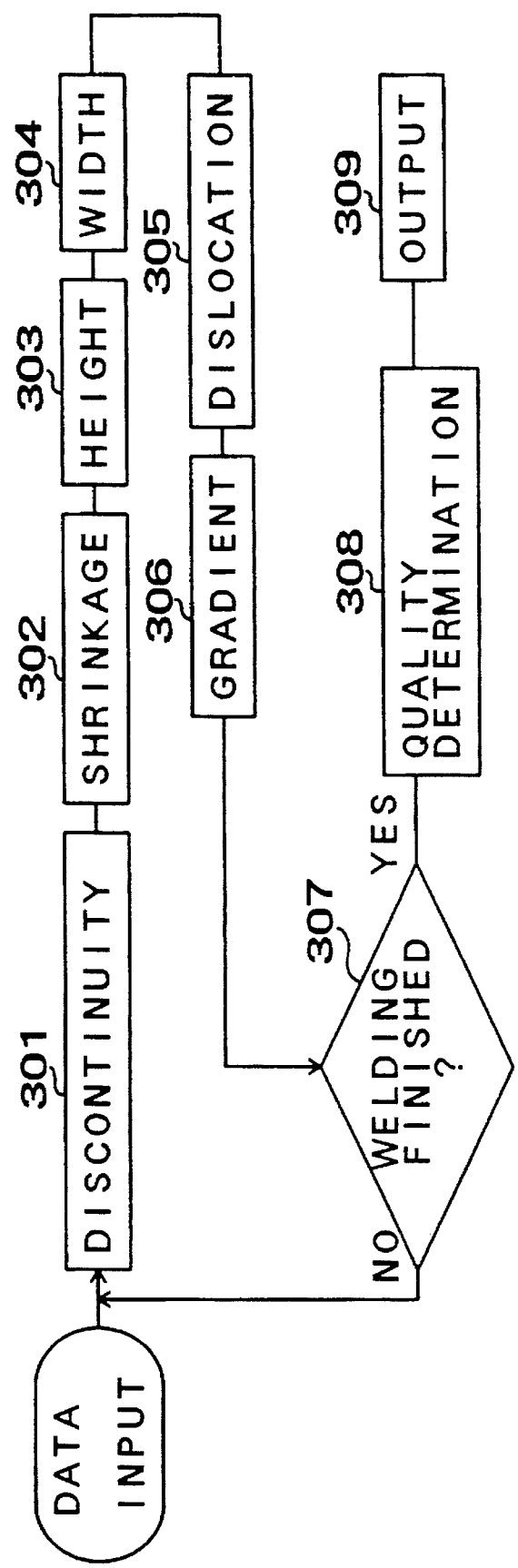
FIG. 10 is a flow chart for determining whether an instant weld bead is acceptable or not.

FIG. 10 illustrates a flow chart of the process that the personal computer performs for determining whether the weld bead 3 is acceptable or not. When the treatments of all the images in accordance with the control routine of FIG. 5 have been finished, the control routine of FIG. 10 is entered. In the routine, the characteristics of each weld bead image are compared with the respective predetermined allowable limits so that whether the weld bead is acceptable or not is determined, for example, from the viewpoints of a sufficient strength and extensibility during stamping and no damage to press rolls. In this instance, FIG. 2 shows various reference patterns.

More particularly, at step 301, it is determined whether a discontinuous portion (melt-down portion) is found in the image. A typical pattern of such a discontinuous portion is shown in block 21 of FIG. 2. At step 302, it is determined whether an excessive shrinkage cavity is found in the weld bead. A typical pattern of the excessive shrinkage cavity is shown in block 17 of FIG. 2. At step 303, it is determined whether the weld bead is excessively high. A typical pattern of an excessively high weld bead is shown in block 16 of FIG. 2. At step 304, it is determined whether the width of the weld bead is insufficient as shown in block 18 of FIG. 2. At step 305, it is determined whether a dislocation is found between the surfaces of the metal sheets 1a and 1b. A typical pattern of the dislocation is shown in block 20 of FIG. 2. At step 306, it is determined whether the gradients of the tangents at the sides of the weld bead are in an appropriate range. These determinations are successively made until the weld beads of all the photograph planes have been determined at step 307. The number of data points which have been determined to be outside the reference limits is counted. Then, the routine proceeds to step 308, where it is determined whether the weld bead is acceptable or not based on a predetermined specification and the counted number of dissatisfactions. The result of the determination is fed to the controllers 14 and 15.

The data treatments in accordance with the routines of FIGS. 5 and 10 are processed in the personal computer after the welding along the weld line 2 is finished. The time period required for treating the data in accordance with the routines of FIGS. 5 and 10 is three seconds at maximum. As a result, an on-line and real-time determination of the quality of the weld bead is possible.

Figure 11:
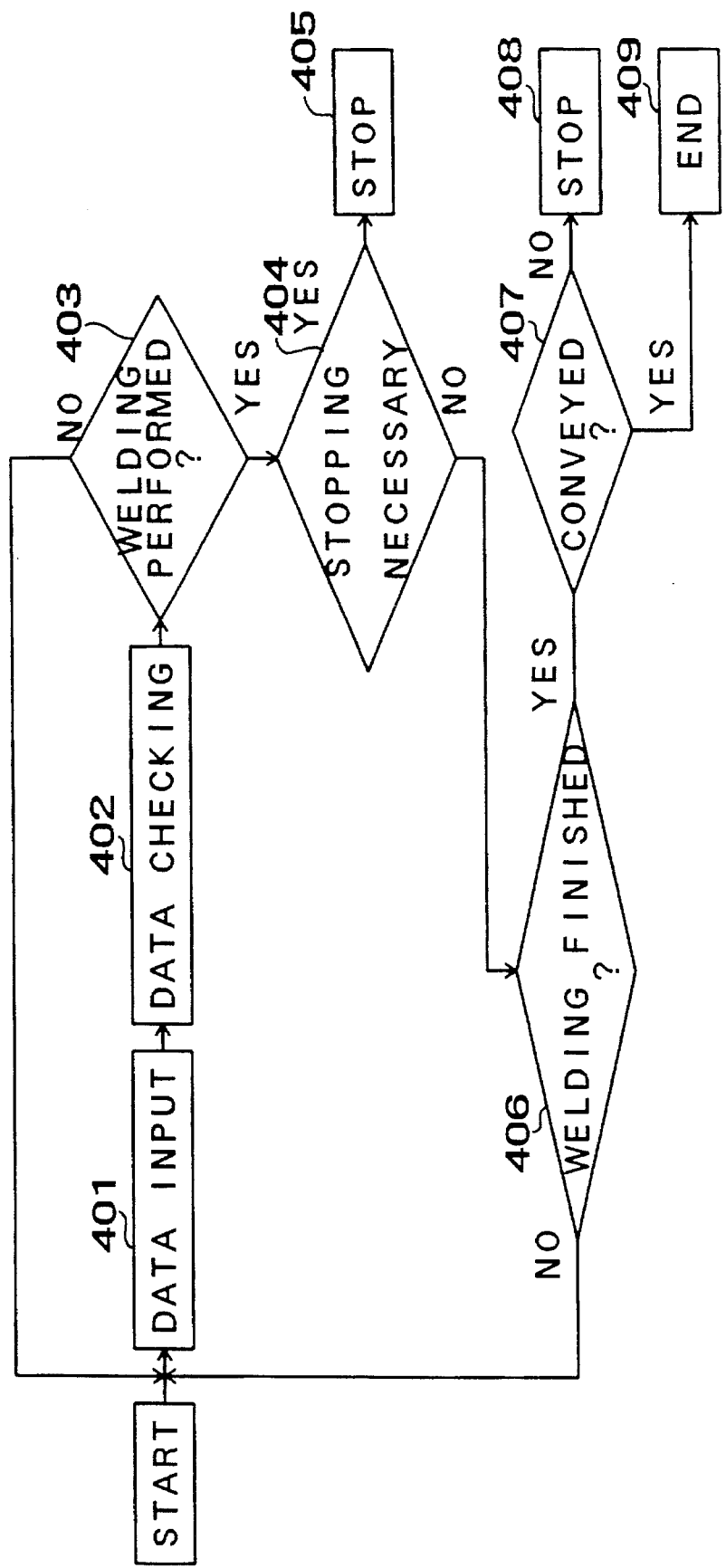
FIG. 11 is a flow chart for determining whether welding is to be stopped or not.

The data is further treated in accordance with a routine of FIG. 11 during the welding so that a non-acceptable assembly having a defect weld bead is detected without a time lag. FIG. 11 functions when the welding is taking place and FIG. 10 functions when the welding is completed. This treatment of the data in accordance with the routine of FIG. 11 is executed so that the defect assembly does not damage the stamping rolls when the one-piece assembly is stamped by the rolls after welding.

More particularly, in FIG. 11, when the data of the width centers of the image 8B (data from the routine of FIG. 4) are stored into the RAM disk, the data is also entered at step 401 and treated by the routine of FIG. 11. Then, at step 402, the data of the image 8B of the instant photograph plane is checked to determine whether the weld bead of the instant image 8B is acceptable or not. Then, at step 403, it is determined the welding of a portion of the welding line corresponding to the instant photograph plane has been finished, and if finished, the routine proceeds to step 404. At step 404, it is determined whether there has been data exceeding the allowable limits in the determinations at step 402. If the weld bead of the instant photograph plane exceeds the allowable limits, the routine proceeds to step 405, where information is fed to the controller for the welding machine controller 15 so that welding is stopped at once. If the weld bead of the instant photograph plane does not exceed the allowable limits, the routine proceeds from step 404 to step 406, where the above-described checking is repeatedly executed until the checking is finished with respect to the images of all the photograph planes. When checking of all the weld bead portions is finished, the routine proceeds to step 407, where a decision is made as to whether the assembly of the welded metal sheets may be conveyed to the next manufacturing step by comparing the weld bead data with a predetermined specification. In the case where the assembly should not be conveyed to the next manufacturing step, the routine proceeds to step 408 where operation of the conveyor is stopped at once. If no stopping instruction is issued from step 407, the routine proceeds to step 409 where the routine ends.

In accordance with the invention, the following advantages are obtained.

First, since a data pretreatment device is provided between the CCD camera and the computer and the data pretreatment device converts the image of the illuminated band representing the weld bead configuration into one-dimensional data before it feeds the data to the computer, the speed of the data treatment is very high and an on-line data and real-time data treatment is possible. Further, the treated data is converted to machine language in the data pretreatment device, allowing the speed of the determination by the computer with respect to the quality of the weld bead to be very high. As a result, an on-line and real-time determination of quality of the weld bead is possible. In the weld bead quality determination, a personal computer can be used without using a large-size and very high-speed computer, which would increase the cost of the inspection apparatus to a great extent if used.

Second, since a plurality of brightness reference levels are applied for determining the width of the image of the illuminated band, an exact decision of the width of the image and therefore the width center of the image is possible without greatly increasing the period for obtaining the width center.

Third, since a plurality of characteristics are extracted from the center line of the image of the illuminated band, and these characteristics are compared with predetermined corresponding allowable limits, the quality of the weld bead can be determined from various viewpoints so that high-grade determination of the weld bead is possible.

Fourth, since the computer includes a memory which is constructed of a semiconductor memory, the speed of storing data and reading data from the memory is very high, which contributes a further speed-up of data treatment of the apparatus of the present invention.

Fifth, if any noise is present, it is removed from the center line of the image of the illuminated band, allowing for a reliable determination of the weld bead.

Last, since the position and the detail of a defect of the weld bead are clearly acknowledged, an appropriate countermeasure can be taken for the detected defect.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the invention as defined by the following claims.

What is claimed is:

1. An apparatus for determining a quality of a weld bead, comprising:

a slit beam emitter for producing a slit beam of light and projecting the slit beam of light obliquely and downwardly on a weld bead joining metal sheets with a width direction of the slit beam of light perpendicular to a longitudinal direction of the weld bead so that the slit beam of light makes an illuminated band on an upper surface of a welded assembly of the metal sheets, a portion of the illuminated band crossing the weld bead being distorted from an extension of the remaining portion of the illuminated band corresponding to a configuration of an upper surface of the weld bead;

a CCD camera, disposed above the illuminated band and moved along the weld bead, for photographing the illuminated band and making a photograph plane, which includes an image of the illuminated band, for each position as the CCD camera is moved along the weld bead, the image of the illuminated band being brighter than a remaining portion of the photograph plane and having a brightest level at a width center of the image in a width direction of the image;

an image pretreatment device, connected to the CCD camera, for scanning each photograph plane along a scanning line which extends substantially perpendicularly to a longitudinal direction of the image and is moved in the longitudinal direction of the image, the image pretreatment device generating an analog signal corresponding to the image of the illuminated band, detecting, along the scanning line, opposite edges of the image of the illuminated band having a brightness level that is greater than a selected reference brightness level, the reference brightness level being selected from a predetermined number of different reference brightness levels by adopting a greatest one of the predetermined number of different reference brightness levels for which edges are detected as the selected reference brightness level, determining a width center of the image as a center of the width of the detected opposite edges of the image along the scanning line, and then converting at least a portion of a signal that corresponds to only the width center of the image into a digital signal for each position of the scanning line as it is moved in the longitudinal direction of the image at predetermined intervals;

a computer, connected to the image pretreatment device and including a memory and a RAM disk, for temporarily storing the digital signal produced by the image pretreatment device, wherein:

the digital signal is stored in the memory for each position of the scanning line as it is moved in the longitudinal direction of the image at predetermined intervals, after scanning all of the positions of the scanning line, storing in the RAM disk one-dimensional data that corresponds to a center line of the image for each photograph plane, the center line is based upon the width centers, the computer reads all the data stored in the RAM disk after welding along a weld line between the metal sheets has been completed, determines characteristics of the image for each photograph plane, compares the characteristics of the image of each photograph plane with respective predetermined limits for an acceptable weld bead so as to determine whether the weld bead is acceptable;

an inspection controller, connected to the computer, for starting and stopping operation of the computer; and a welding machine controller, connected to the inspection controller, for starting and stopping operation of a welding machine and a conveyor carrying said metal sheets, so that an unacceptable weld bead will not be conveyed to a subsequent manufacturing step.

2. An apparatus according to claim 1, wherein the slit beam emitter includes a semiconductor laser for emitting a laser beam, and a collimator lens and a cylindrical lens for collecting the laser beam emitted from the semiconductor laser into the slit beam.

3. An apparatus according to claim 1, wherein the image pretreatment device includes a display for displaying the photograph plane in which the image of the illuminated band extends in a vertical direction and the scanning line extends in a horizontal direction.

4. An apparatus according to claim 1, wherein the computer is a personal computer.

5. An apparatus according to claim 1, wherein the computer includes a RAM disk including a semiconductor memory.

6. An apparatus according to claim 1, wherein the predetermined number of reference brightness levels includes four different brightness levels.

7. An apparatus according to claim 1, wherein the computer further includes means for removing a noise from the center line of the image.

8. An apparatus according to claim 1, wherein the predetermined limits for an acceptable weld bead include limits for weld bead projection, weld bead shrinkage, weld bead width, weld bead undercutting, dislocation at the weld bead between the metal sheets, and discontinuity at the weld bead.

9. An apparatus according to claim 1, wherein the computer includes means for determining in real-time or without a time delay, whether the weld bead includes a defect exceeding a predetermined limit and means for issuing an instruction to stop welding if it detects a defect exceeding the limit in the weld bead.

10. An apparatus according to claim 1, wherein the weld bead is a laser-weld bead joining different metal sheets for one-piece stamping for an automobile panel.

11. An apparatus according to claim 1, wherein said digital signal corresponding to the width center of the image for each position of the scanning line is retained in said RAM disk until welding is completed, after which digital signals for each photograph plane are analyzed by said computer to determine the quality of the weld bead.

12. An apparatus according to claim 1, wherein said computer includes a memory for temporarily storing said digital signals fed from said image pretreatment device until scanning is completed for said photograph plane, after which said signals representing one photograph plane are stored in said RAM disk.

* * * * *